(No Model.)

E. A. OLIVER.
COMBINED POT COVER AND COLANDER.

No. 355,622. Patented Jan. 4, 1887.

WITNESSES
Villette Anderson.
Philip C. Masi.

INVENTOR
Elam A. Oliver
by Anderson & Smith
ATTORNEYS

UNITED STATES PATENT OFFICE.

ELAM ALPHEUS OLIVER, OF BELLEVILLE, WISCONSIN.

COMBINED POT-COVER AND COLANDER.

SPECIFICATION forming part of Letters Patent No. 355,622, dated January 4, 1887.

Application filed May 7, 1886. Serial No. 201,487. (No model.)

*To all whom it may concern:*

Be it known that I, ELAM ALPHEUS OLIVER, a citizen of the United States, residing at Belleville, in the county of Dane and State of Wisconsin, have invented certain new and useful Improvements in Combined Pot-Covers and Colanders; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
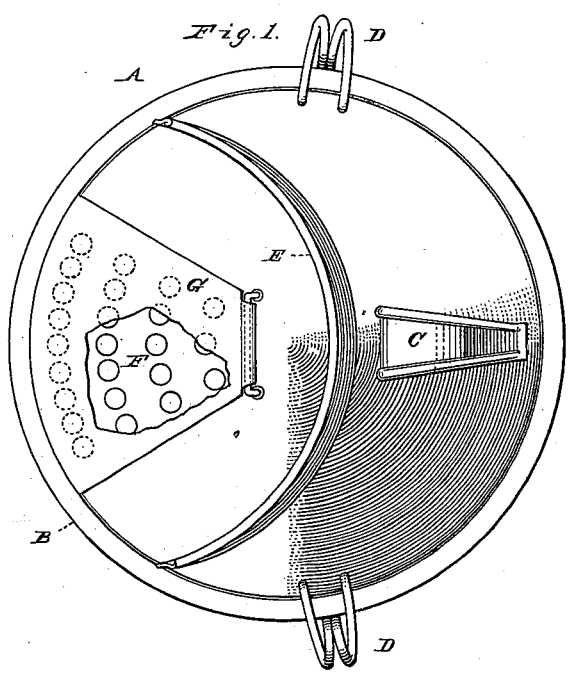
Figure 2:
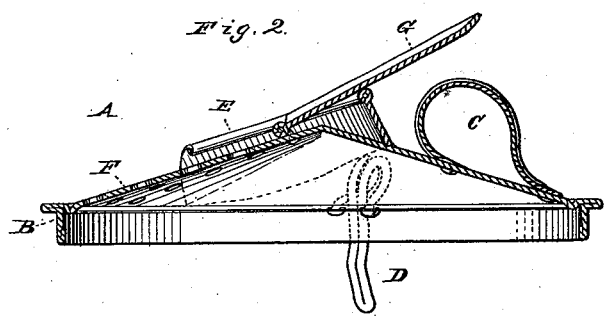

Figure 1 of the drawings is a representation of this invention and is a top view, partly broken away in one portion. Fig. 2 is a vertical section.

My invention relates to pot-covers and colanders; and it consists in the construction and novel combination of parts, as hereinafter described, and pointed out in the claim.

Referring by letter to the accompanying drawings, A designates the pot-cover, which is provided with the usual rim-flange, B, and a handle, c, by which to put it in place and to displace it when necessary. The cover A is also provided at opposite sides with spring-catches D, which secure it in place on the mouth of the vessel. The upper face of the cover A is provided with an arc-shaped upwardly-projecting flange, E, which partially surrounds the perforated section F of the cover A. The perforated section F of the cover is protected by a hinged shield, G, which confines the steam to the vessel when the shield is closed, and also shields the hands of the person handling the vessel when the latter is turned up to pour the water off of the articles being cooked in the vessel. The arc-shaped flange E permits the vessel to be turned upside down and rested on the cover while the latter is in place, so that the water may be drawn off and the articles in the vessel be dried upon the stove before removing said articles from the vessel.

If desirable, the hinged shield may be opened or turned up to permit the escape of the steam when necessary.

Having described this invention, what I claim, and desire to secure by Letters Patent, is—

The combination of a pot-cover having a perforated section, a hinged shield covering the perforated section, and an arc-flange secured to said cover around the hinged shield, substantially as specified.

In testimony whereof I affix my signature in presence of two witnesses.

ELAM ALPHEUS OLIVER.

Witnesses:
S. BAILEY,
JOHN WIESEN.